A. H. ELLIS.
COMBINED TYPE WRITING AND ADDING MACHINE.
APPLICATION FILED AUG. 8, 1905.

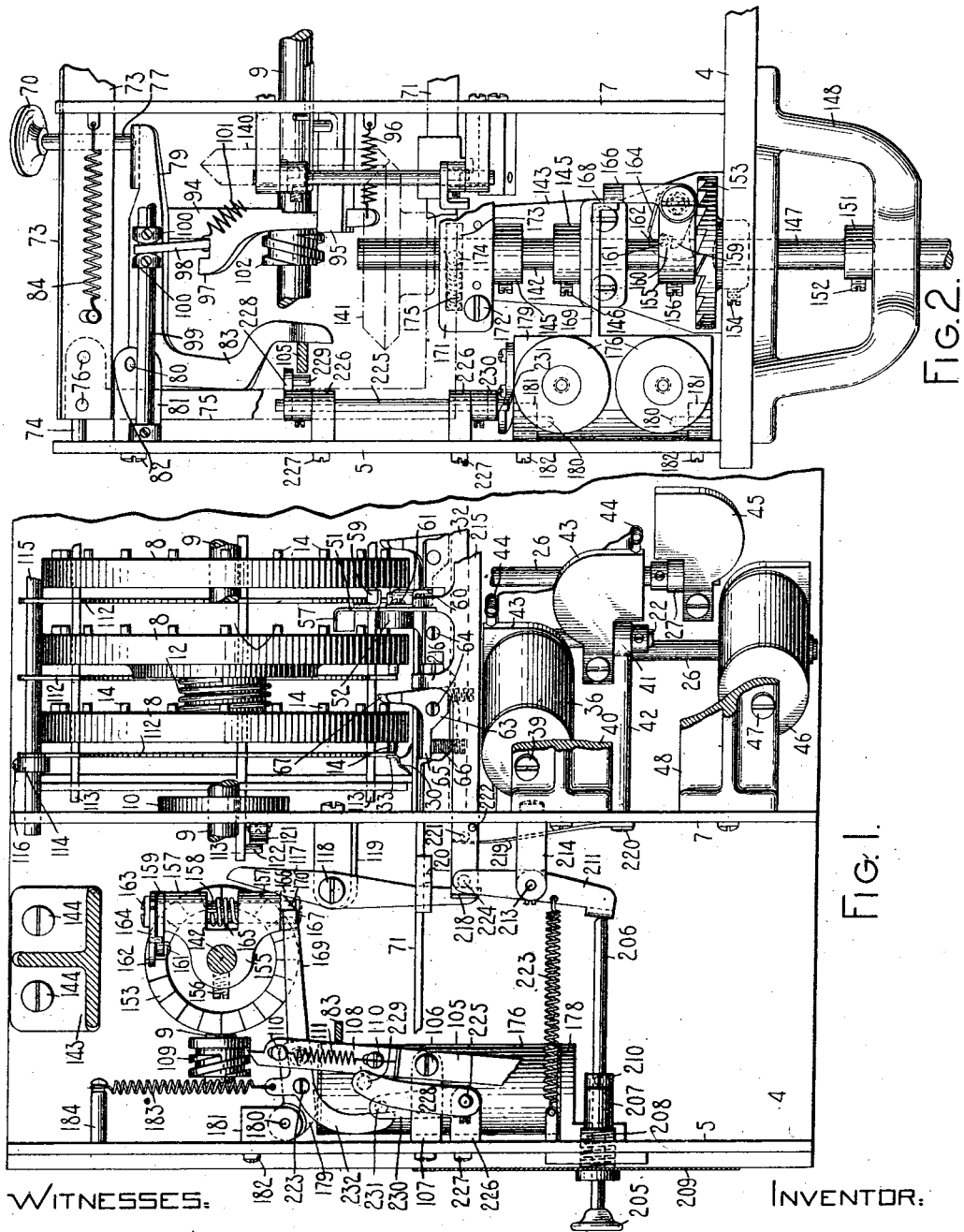

1,091,820.

Patented Mar. 31, 1914.

7 SHEETS—SHEET 2.

WITNESSES:
M. F. Hammacher
E. M. Wells

INVENTOR.
Albert H. Ellis
By Jacob Felbel
HIS ATTORNEY

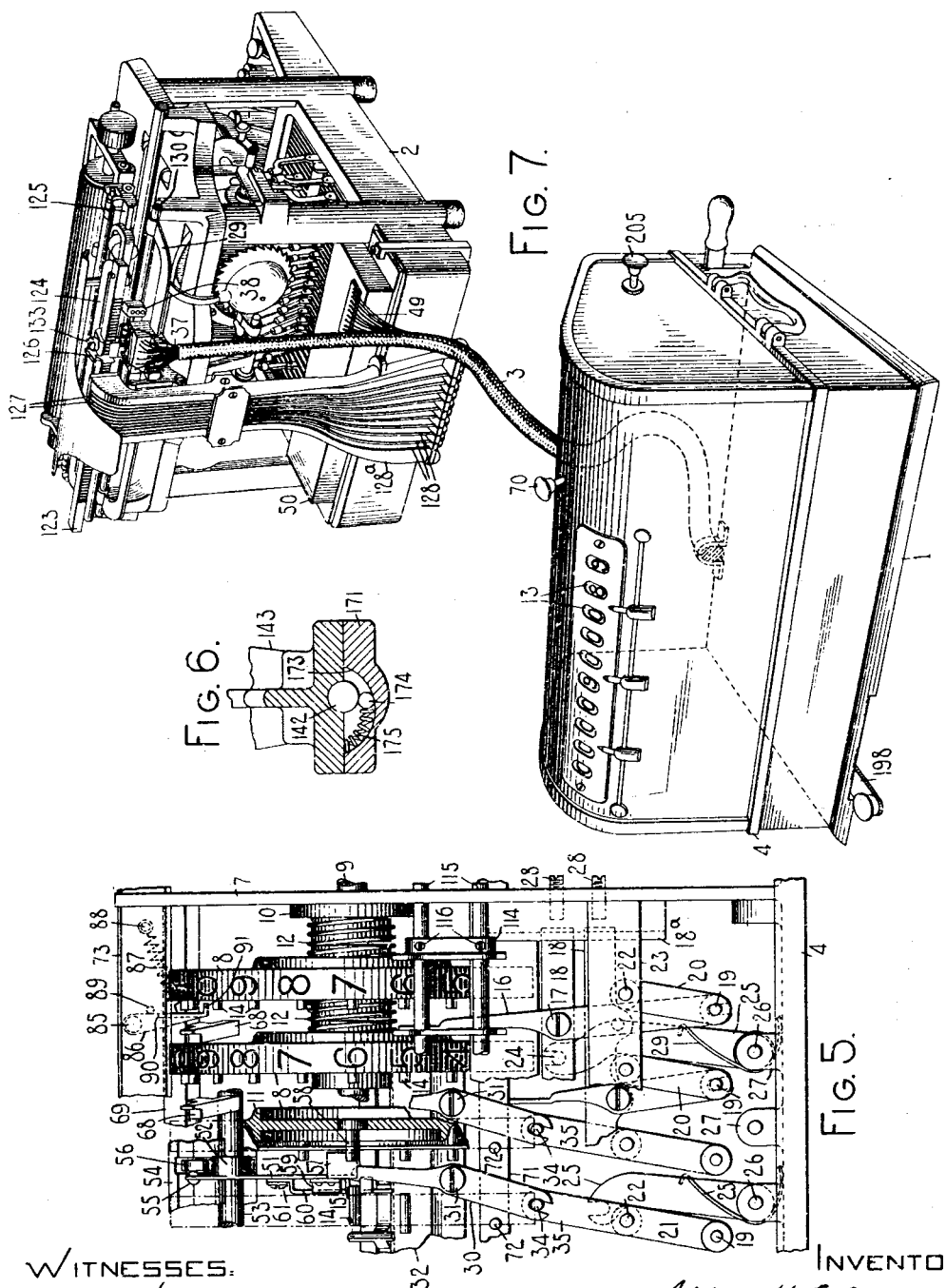

A. H. ELLIS.
COMBINED TYPE WRITING AND ADDING MACHINE.
APPLICATION FILED AUG. 8, 1905.
1,091,820.
Patented Mar. 31, 1914.
7 SHEETS—SHEET 4.
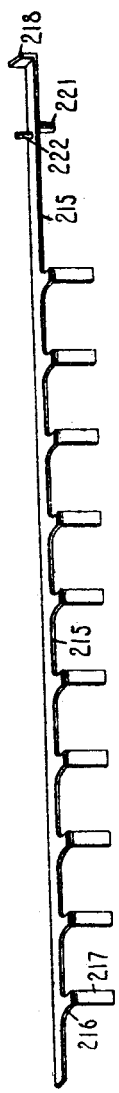
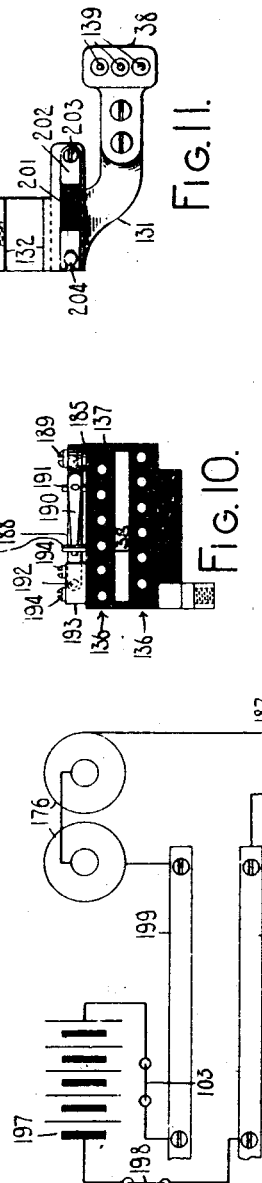
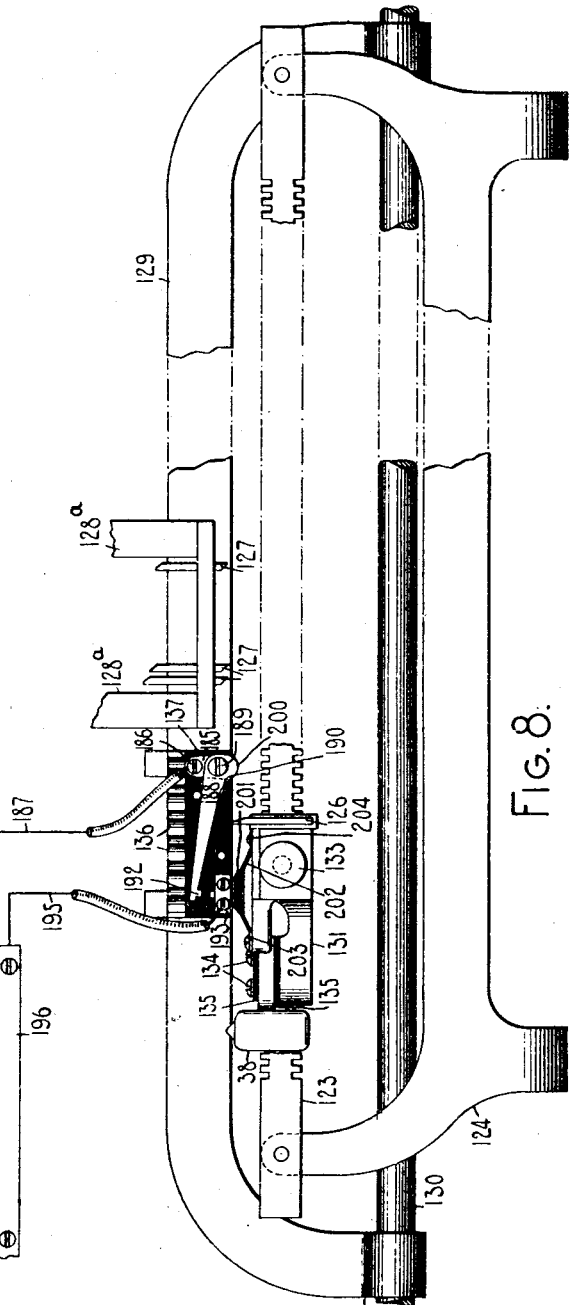
WITNESSES:
M. F. Hannweber
E. M. Wells
INVENTOR:
Albert H. Ellis
By Jacob Felbel
HIS ATTORNEY

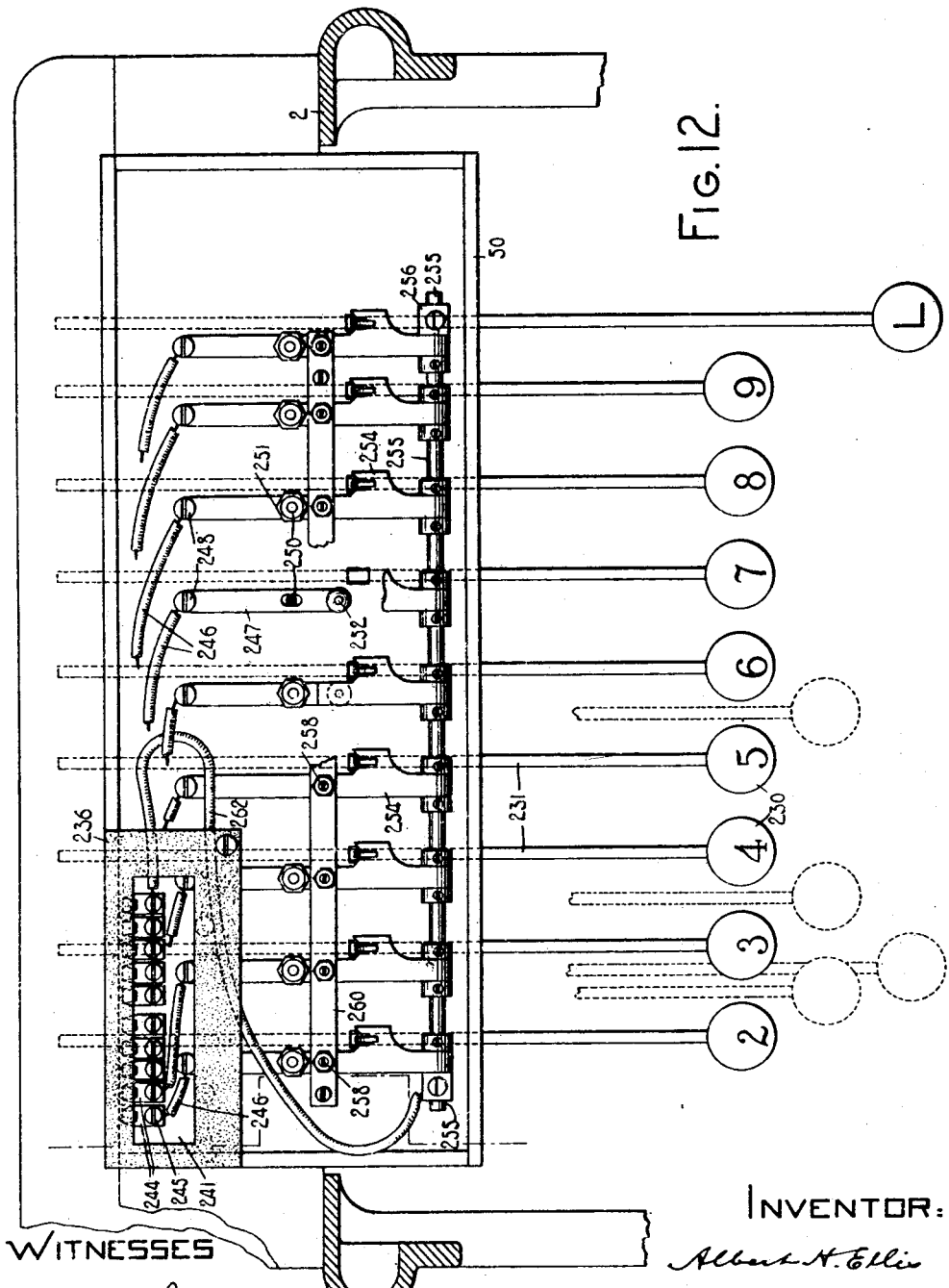

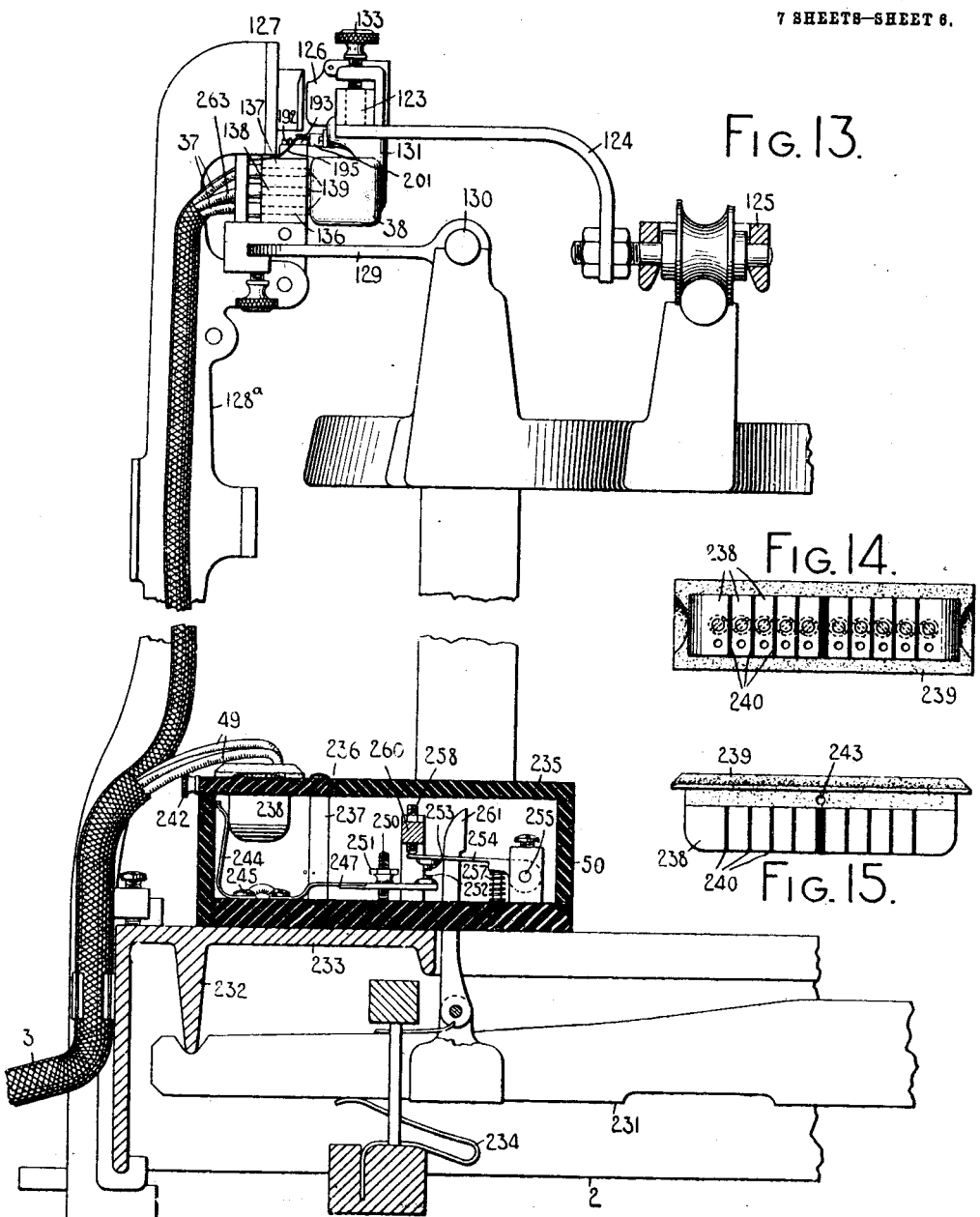

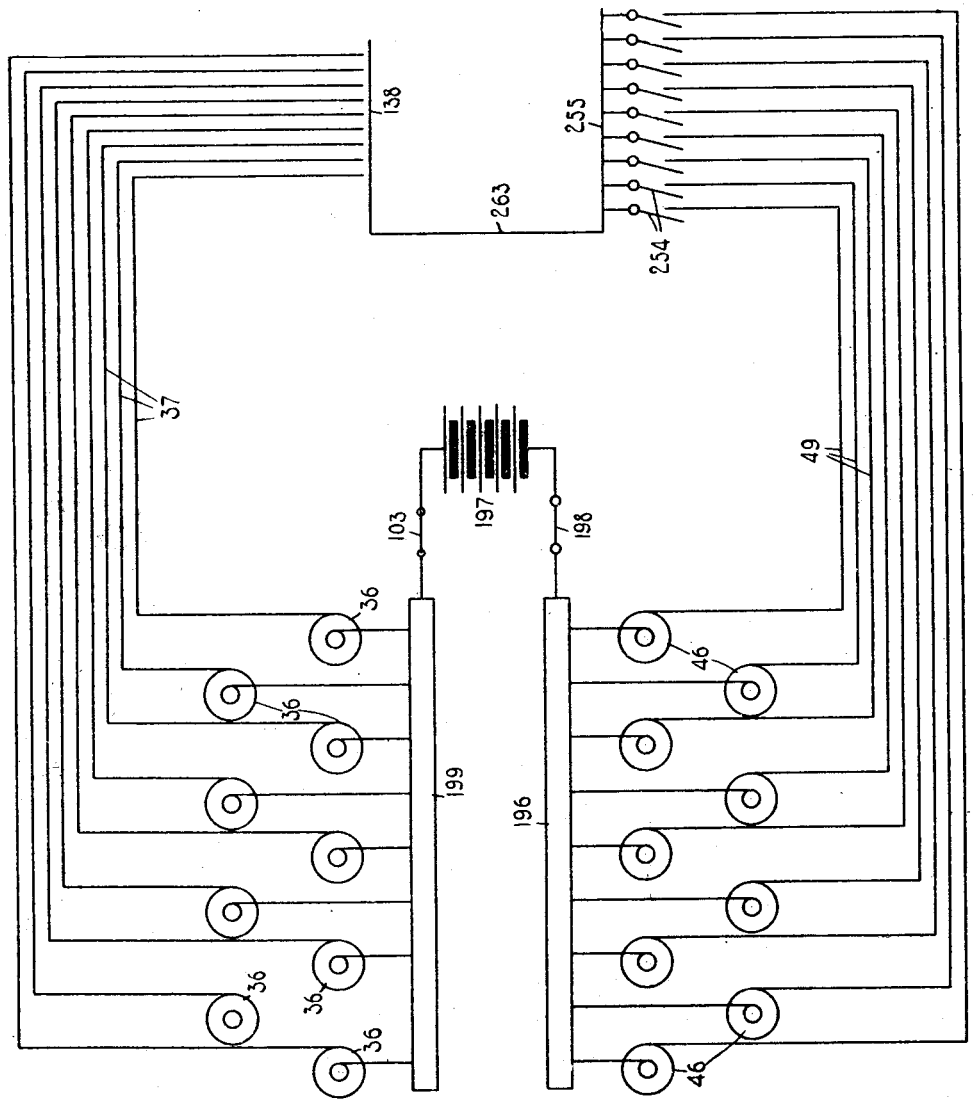

UNITED STATES PATENT OFFICE.

ALBERT H. ELLIS, OF KINGSTON, NEW YORK, ASSIGNOR, BY MESNE ASSIGNMENTS, TO REMINGTON TYPEWRITER COMPANY, OF ILION, NEW YORK, A CORPORATION OF NEW YORK.

COMBINED TYPE-WRITING AND ADDING MACHINE.

1,091,820.      Specification of Letters Patent.      Patented Mar. 31, 1914.

Application filed August 8, 1905. Serial No. 273,297.

*To all whom it may concern:*

Be it known that I, ALBERT H. ELLIS, citizen of the United States, and resident of Kingston, in the county of Ulster and State of New York, have invented certain new and useful Improvements in Combined Type-Writing and Adding Machines, of which the following is a specification.

My invention relates principally to adding machines.

My invention relates also to combined typewriting and adding machines.

The present invention is in the nature of an improvement on, or modification of, the invention set forth in my prior application Serial No. 175,457, filed October 2nd, 1903, patented April 30, 1907, No. 852,016.

One of the objects of the present invention is to so arrange the adding machine described in my said patent that the register wheels are not turned until after a number has been set up.

Another object is to give the operator an opportunity to inspect each number after it is written and before it is added, to see whether the written number is correct.

Another object is to provide means whereby in case the operator has struck a wrong numeral key and thus written the wrong number on the typewriting machine and set up the wrong number on the adding machine, said erroneous number may be erased from the typewriting and also from the adding machine, so that said number is not added on the adding machine.

Another object of the present invention is to provide automatic means controlled by the typewriting machine for bringing into operation a motor to operate the adding mechanism to add a number that has been set up.

Other objects will appear hereinafter.

To the above ends my invention consists in certain features of construction and combinations and arrangements of parts which will be fully set forth herein and particularly pointed out in the claims.

Figure 4:
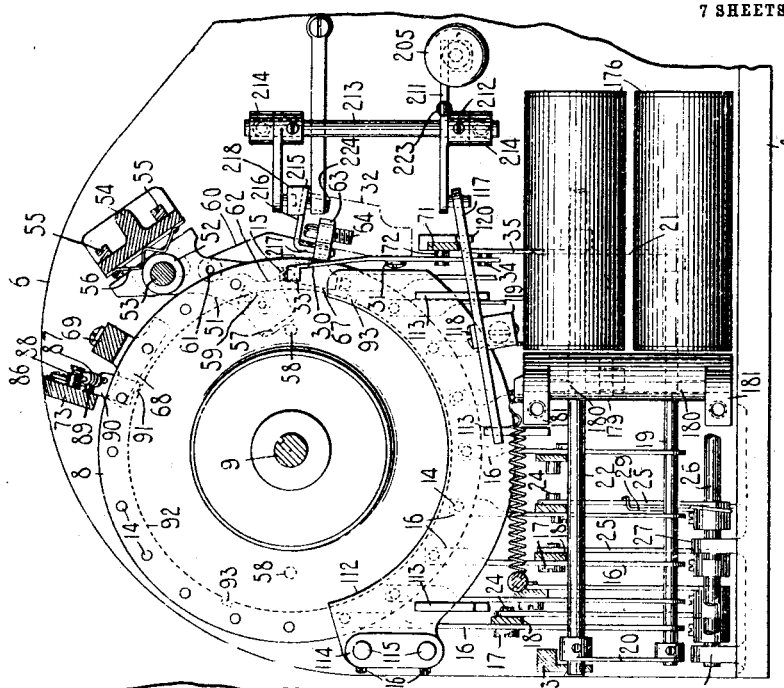
Figure 3:
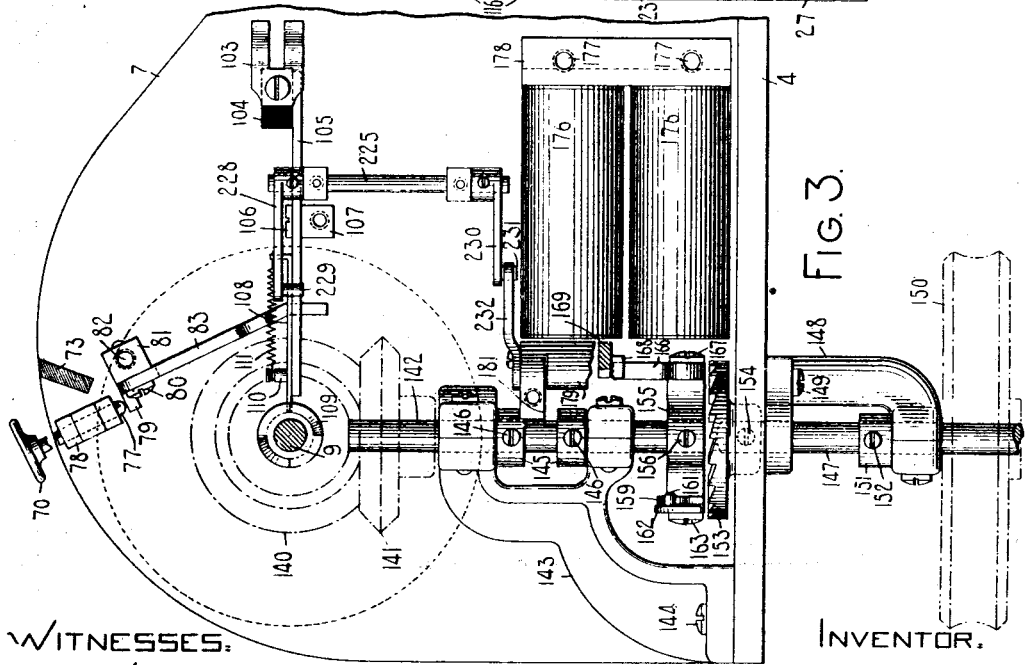

In the accompanying drawings, Figure 1 is a plan view of one end of the adding mechanism looking from the back of the machine. Fig. 2 is a rear elevation of part of the mechanism shown in Fig. 1. Fig. 3 is an elevation of the right-hand end of the adding mechanism with the right-hand end frame plate removed. Fig. 4 is a view similar to Fig. 3, but with the first two frame plates at the right-hand end of the machine removed and some of the parts shown in Fig. 3 omitted. Fig. 5 is a partial front elevation of the adding mechanism. Fig. 6 is a detail view in horizontal section showing a detent device. Fig. 7 is a perspective view of a typewriting machine and adding machine connected together by an electric cable. Fig. 8 is a plan view of parts of the typewriter, some electrical connections being shown diagrammatically. Fig. 9 is an isometric view of a restoring bar. Fig. 10 is a front view of a contact block. Fig. 11 is a rear view of the contact shoe. Fig. 12 is a top plan view showing a part of the keyboard of the typewriting machine and showing the key-controlled electrical connections, certain parts being omitted or broken away and parts shown in section. Fig. 13 is an end elevation of the rear part of the typewriting machine showing the electrical connections, parts being broken away or shown in section or omitted as has been found convenient. Fig. 14 is a bottom view of an electrical plug. Fig. 15 is a rear view of the same. Fig. 16 is a diagram of the electrical connections between the typewriter and the denomination selecting and digit selecting magnets.

In most of the figures of the drawings, parts have been shown in section or broken away and parts have been omitted as has been found convenient.

Most of the mechanism used in the present instance is identical with that shown and described in my said patent to which reference is made for a more complete showing and description thereof. In the present instance I have shown only so much of said mechanism as is necessary to an understanding of the present modifications thereof.

The adding machine 1 (Fig. 7) is controlled by the keys and carriage of a typewriting machine 2 by certain electrical devices, through a series of wires joining the two machines and inclosed within a cable 3. The main frame of the adding machine comprises a horizontal plate 4 which divides said machine into an upper and a lower section. Most of the adding mechanism is inclosed in the upper section and in the lower section are mounted an electric motor and a number of electrical connections which will be more particularly referred to hereafter.

Rising from the horizontal plate 4 are a vertical frame plate 5 at the right-hand end of the machine, a second vertical frame plate 6 at the left-hand of the machine, and a third vertical frame plate 7 which divides the upper section of the adding machine into two compartments. A series of register wheels 8 are mounted side by side on a shaft 9 which is journaled at its left-hand end in a bearing carried by the frame plate 6 and which projects through the frame plate 7 into the right-hand compartment of the adding machine, said shaft being journaled in a bearing piece 10 (Fig. 1) secured to said frame plate 7. As shown in Fig. 5, each of the register wheels 8 is formed on each of its sides with an annular flange 11 projecting from the web of the wheel and within said annular flanges there are friction disks mounted on the shaft 9 in such manner that said disks are constrained to turn with said shaft. Said friction disks are pressed against the webs of the wheels 8 by compression springs 12 so that each of the register wheels is connected with the shaft 9 by frictional contact. Preferably a friction pad is interposed between the web of wheel 8 and the friction disks as shown in my patent referred to above. When said shaft is turned each of the wheels 8 tends to turn with it and does turn with it unless held against rotation. Each of the wheels 8 has on its periphery two series of digits from "0" to "9" inclusive, and said digits are read through sight openings 13 (Fig. 7) in the casing of the adding machine. The motion of the wheels 8 under the impulse of the driving shaft 9 is controlled by a series of settable stops or digit determining means 14. Said stops, as here shown, are in the form of pins which extend through the wheels parallel to the shaft 9, said pins normally projecting a short distance from the left-hand faces of the register wheels, but adapted to be pushed toward the right so as to project a short distance from the right-hand faces of the wheels.

In Fig. 1 it will be seen that all of the pins 14 except one, normally project toward the left, the exception being that pin in each wheel which, as seen in the plan view, is nearest the back of the machine. When any pin is caused to project from the right-hand face of the register wheel it is in its operative position, that is to say it is in position to engage a stop 15 (Fig. 4) which arrests the wheel and prevents it from turning farther with the shaft 9. The pins 14 are set to operative position by a series of setting levers 16, nine such levers being provided for each register wheel. The setting levers 16 are pivoted on shouldered and headed screws 17 that are threaded into reciprocatory bars 18 slidably mounted in slots in frame pieces 18ª mounted on the inner faces of the upright frame plates 6 and 7. There are twenty digits on each register wheel and twenty pins 14, one for each digit. The shaft 9 turns toward the front of the machine and to add one on a register wheel, that pin 14 which is in engagement with the stop 15 is pushed to inoperative position and the first pin below it is pushed to operative position. The register wheel will then turn with the shaft 9 through one-twentieth of a complete rotation, thus bringing the next digit on the wheel before the sight opening 13. If two is to be added the second pin below the stop 15 will be pushed to operative position and the wheel will turn through two spaces and so on.

As shown in Fig. 4, one of the setting levers 16 has its upper end opposite each one of the nine pins preceding the one that is in engagement with the stop 15. That setting lever 16 which is nearest the back of the machine therefore corresponds to the digit "1", the next one to the digit "2" and so on, that lever which is nearest the front of the machine corresponding to the digit "9". The reciprocatory bars 18 lie beneath the entire series of register wheels and there is one such bar for each digit. All of the setting levers 16 corresponding to the digit "1" are mounted on that bar 18 which lies nearest to the back of the machine; all of the setting levers 16 corresponding to the digit "2" are mounted on the second of said bars, and so on.

Each of the setting levers 16 is extended below its bar 18 and is forked at its lower end to embrace a yoke bar 19. Said yoke bars extend in a front and back direction, there being one such bar for each register wheel and all of the setting levers 16 that coöperate with one of the register wheels are in engagement with the yoke bar 19 corresponding to that register wheel. Each of said yoke bars is mounted at its forward end on an arm 20 and at its rear end on an arm 21, both of said arms depending from a rock shaft 22 which is journaled at its forward end in a longitudinal frame bar 23 that is supported at its ends by the frame plates 6 and 7. In order to reciprocate the bars 18 each of said bars has a pin 24 projecting therefrom into a slot in the upper end of an arm 25 which is rigidly mounted on a rock shaft 26. Said rock shafts 26 are journaled in lugs or ears 27 rising from the horizontal frame plate 4. The motion of the reciprocatory bars 18 is adjustably limited by set screws 28 threaded through the plates 6 and 7 and having their ends in position to be engaged by the ends of the bars. The arms 25 are restored to normal position by springs 29 (Fig. 5) coiled about the hubs of said arms and at one end pressing against said arms and at the other end pressing against the frame plate 4. The construction is such that if one of the bars 18 be moved toward the right until it is arrested by its stop screw 28 all of the setting levers 16 mounted on said bar will have their upper ends moved toward the right, but not through a distance sufficient to engage one of the pins 14. Furthermore, if one of the shafts 22 be rocked, the yoke bar 19, connected with said rock shaft, will move toward the left, thus moving the lower ends of all of the levers 16 of that denomination toward the left and the upper ends of all of said levers toward the right; but this motion also is not sufficient to cause any of said levers to engage its pin 14. If, however, one of the yoke frames and one of the reciprocatory bars be operated at the same time, all of the levers 16 connected with that reciprocatory bar will have their upper ends moved toward the right and all of the levers 16 of the denomination corresponding to the operated rock shaft 22 will have their upper ends moved toward the right, and that one of said setting levers 16 that is mounted on the operated bar 18 and that is also connected with the operated yoke bar 19, will be moved a double distance, thus pressing its pin 14 to operative position. It will thus be seen that when the bar 18, corresponding to a particular digit, and the yoke bar 19, corresponding to a particular denomination, are operated at the same time, the stop pin 14 corresponding to that digit and that denomination will be set to operative position. In order to add the digit thus set up in one of the wheels, it is necessary that the stop pin 14 that is in engagement with the stop 15 be reset to inoperative position. To this end a series of levers 30 (Fig. 4), one for each register wheel, are pivoted on shouldered and headed screws 31 that are threaded into a frame bar 32 that is mounted at its ends in the frame plates 6 and 7. The upper end of each of the levers 30 stands on the right-hand side of the corresponding register wheel and is bent off, as shown at 33, to form a tappet that stands opposite the end of the pin 14 that is in engagement with the stop 15. The lower end of the lever 30 is forked and embraces a pin 34 projecting from an arm 35 projecting upward from the rock shaft 22. As shown in the present instance the arm 35 is in the nature of an upper prolongation of the arm 21 above described. The construction is such that when any rock shaft 22 is operated, the arm 35 is moved toward the right, thus swinging the lower end of the lever 30 toward the right and the upper end of said lever toward the left and pressing the pin 14 to inoperative position.

The denomination selecting rock shafts 22 are operated by a series of electromagnets 36 (Fig. 1), the electric circuits of which include a series of wires 37 (Fig. 7) which are selected by a contact shoe 38 mounted on the carriage of the typewriting machine. Said electric circuits will be more fully described hereinafter. The electromagnets 36 are secured by means of screws 39 to a frame bar 40 that is mounted at its ends in the frame plates 6 and 7. Each of the rock shafts 22 is journaled at its rear end in an ear 41 (Fig. 1) rising from a frame bar 42 that is mounted at its ends in the frame plates 6 and 7 and each of said rock shafts has mounted on its rear end an armature 43 that lies beneath one of the electromagnets 36. Each of said armatures is provided with a returning spring 44. The digit selecting rock shafts 26 having mounted on their rear ends armatures 45 (Fig. 1) lying below the lower ends of a series of digit selecting electromagnets 46 which are secured by screws 47 to a frame bar 48 which is mounted at its ends in the frame plates 6 and 7. The electric circuits of the digit selecting magnets 46 include a series of wires 49 (Fig. 7) that enter the cable 3 from a box or case 50 mounted on the back shelf of the typewriting machine. Within this case 50 are mounted a series of contacts controlled by the numeral keys of the typewriting machine. The construction is such that when the carriage stands in the position corresponding to a particular denomination in the adding column, if a numeral key be depressed an electric circuit will be completed through that magnet 46 corresponding to said numeral key, and through that magnet 36 corresponding to that denomination, with the result that the rock shafts 26 and 22 appropriate to said digit and denomination, will be simultaneously operated, thus returning to inoperative position that pin 14 in the wheel of corresponding denomination that was in engagement with the stop 15 and setting to operative position that pin 14 in said wheel which corresponds to the digit written on the typewriter.

In order to provide for carrying from one denomination to another, the stop 15 is made movable into and out of the path of the pin 14. To this end each of said stops consists of an ear bent off from a transfer arm or lever 51 (Fig. 4), the hub 52 of which is journaled on a rod 53 which is mounted on a frame bar 54 which is supported at its ends by the frame plates 6 and 7. Said transfer lever is capable of a slight swinging motion which is adjustably limited in both directions by adjusting screws 55 threaded through the frame bar 54 and adapted to engage arms of said lever 51. Said lever is yieldingly held in any position to which it may be set by a friction spring 56 that presses against the frame bar 54 and the hub 52 of said lever. Each of said transfer levers extends between two of the register wheels 8, the stop 15 being bent off toward the left from said lever to engage the pins 14 of the wheel of higher denomination. Each of said levers has bent off toward the right therefrom a cam portion 57 which lies in the path of two transfer pins 58 that project from the left-hand side of the wheel of lower denomination. When said wheel of lower denomination passes from its "9" to its zero position, one of the pins 58 passes the cam 57, pressing the transfer lever toward the back of the machine, thus removing the stop 15 from the path of the pin 14. When said pin escapes from the 59 projecting from its left-hand face into the path of the pin 14 which has just escaped from the stop 15 and said pin, engaging said cam, restores the transfer lever to normal position. In order to set the next succeeding pin 14 to operative position in time to have said pin arrested by the stop 15, a lever 60 is pivoted at its upper end at 61 to the transfer lever 51 and said lever 60 has a cam edge 62 lying in the path of the pin 14. When said pin escapes from the stop 15 it engages the cam 62, and presses the lever 60 toward the rear of the machine. The lower ends of said levers 60 play in vertical slots in the front face of the frame bar 32; and in a horizontal slot in said frame bar lie a series of bell crank levers 63 which are pivoted on screws 64. The levers 60 engage transversely extending arms 65 of said bell crank levers 63 (Fig. 1) and press said arms toward the rear of the machine. Said arms 65 are also engaged by returning springs 66 seated in holes in the frame bar 32. Each of the bell crank levers 63 has a forwardly projecting arm of T-shape and the upper end of the cross of said T-shaped arm normally lies to the left of that pin 14 that is in engagement with the stop 15. When said pin escapes from said stop the lever 60 presses the arm 65 toward the rear of the machine, thus moving the T-shaped arm 67 toward the right, thus pressing the next succeeding pin 14 to operative position. Immediately thereafter the first pin 14 engaging the cam 59 moves the stop 15 into the path of the newly set pin 14. It will be perceived that in this operation one of said pins 14 escapes past the stop 15 without being reset to inoperative position. In order to reset any such pins before they come within the part of the wheel covered by the setting levers 16, there is provided a series of wipers or cams 68 consisting of blocks mounted on a frame bar 69 which is secured at its ends to the frame plates 6 and 7. The wipers 68 cam to inoperative position the pins 14 that pass them without having been first reset.

In order to reset the register wheels to zero at the end of a registering operation, I provide a zero key 70 and means controlled by said key for setting to inoperative position all those pins 14 that are in engagement with the stops 15 and automatically setting to operative position a pin 14 in each wheel that is adapted to arrest that wheel in its zero position. The first of these operations is performed by actuating all of the levers 30 that reset the pins to inoperative position. To this end a sliding bar 71 lies just back of the lower ends of all of said levers 30 and said bar has a series of pins 72 projecting therefrom in such position that if the bar be moved toward the right, one of said pins will engage each of the levers 30 and move its lower end toward the right, thus moving its upper end toward the left and resetting the pin 14 of the corresponding wheel. The bar 71 has sliding bearings in the frame plates 6 and 7, through the latter of which said bar projects into the right-hand compartment of the machine. A new pin 14 is set by means controlled by a second sliding bar 73 mounted above the register wheel and having a sliding bearing in the frame plate 6. At its right-hand end the bar 73 is provided with a pin 74 that projects into the frame plate 5 and forms a sliding bearing for that end of said bar. The two bars 71 and 73 are connected together at their right-hand ends by a cross bar 75 secured thereto by screws or rivets 76. The key 70 has a stem 77 slidably mounted in a bracket 78 projecting from the frame plate 7 and the inner end of said key stem engages an ear bent off from a bell crank lever 79 which is pivoted at 80 to a bracket 81 that is secured by a screw 82 to the inner face of the frame plate 5. The bell crank lever 79 has an arm 83 that engages the cross bar 75 in such manner that when the key 70 is depressed said cross bar is moved to the right, carrying with it sliding bars 71 and 73. The latter of said bars is provided with a returning spring 84 secured at one end to said bar and at the other end to the frame plate 7. It will be perceived that when the key 70 is depressed all of the pins 14 that are in engagement with the stops 15 will be reset to inoperative position.

The bar 73 controls devices for setting pins adapted to cause the register wheels to be arrested in zero position, said devices being shown in Figs. 4 and 5. At points 85, a little to the left of the several register wheels, a series of levers 86 are pivoted to the bar 73 and said levers extend into the spaces between the register wheels. Each of said levers is drawn toward the right by a spring 87 which is connected at one end to the lever and at the other end to a pin 88 projecting from the bar 73. Said spring normally holds the lever in engagement with a stop pin 89 projecting from said bar. The levers 86 may conveniently be constructed of sheet metal and each of them has bent off therefrom a flat portion 90 that lies parallel with the web of the register wheel. Each of said levers also has bent off from its free end toward the right an ear or lug 91. Each of the register wheels has on its right-hand face an annular flange 92 that extends inward from the flat peripheral face of the wheel, and it is in this flange that one end of each of the pins 14 is mounted, the other ends of said pins being mounted in the web of the wheel. The flange 92 is formed with two notches 93 situated diametrically opposite to each other. The parts are so constructed that when upon the depression of the zero key 70 the bar 73 is moved toward the right, the lug 91 engages and is arrested by the flange 92 and the stop pin 89 moves away from the lever 86, stretching the spring 87. At the same time the operative pins 14 have been reset. If now the shaft 9 be turned, each of the register wheels will turn with it until one of the notches 93 reaches the lug 91, when the lever 86 will be drawn to the right by its spring 87, the lug 91 entering the notch 93 and arresting the wheel. The notches 93 are so positioned that when the lug 91 enters one of said notches, the flat portion 90 of the lever 86 presses one of the pins 14 to operative position. In order for the parts to operate as has been described it is necessary that the bar 73 be held in its right-hand position until all of the register wheels have been arrested by the lugs 91. In order to insure that this operation shall take place it is necessary that said bar be held in its right-hand position for at least one-half a rotation of the shaft 9. If then the bar 73 be permitted to return to its normal position under the impulse of the returning spring 84, the pins 89 will cause all of the levers 86 to move with said bar and withdraw the lugs 91 from the notches 93, thus releasing the register wheels and permitting them to turn with the shaft. Each of said register wheels will then have one of its pins 14 set to operative position and as the shaft continues to turn, these pins will be brought around to the transfer levers 51. By this time each of the register wheels will have made more than half of a rotation and one of the transfer pins 58 will, therefore, have passed the cam 57 and have cammed the transfer lever to its transfer position with the stop 15 out of the path of the pin 14. It is necessary therefore that the notch 93 be in such position; that the pin 14 set by the lever 86 is not the pin corresponding to the zero position of the wheel, but that pin corresponding to the "9" position of the wheel. Said pin is not arrested by the stop 15, but it operates the cams 62 and 59, thus setting to operative position the next succeeding pin 14 and restoring the stop 15 to operative position.

In order to automatically retain the bar 73 in its right-hand position through at least half a rotation of the shaft 9, the means shown in Fig. 2 are provided. The lever 79 has pivoted thereto an arm 94, the free end of which lies in a slot formed in the outer end of a bracket 95 projecting from the frame plate 7. Said arm is drawn toward said frame plate 7 by a spring 96 which is connected at one end to the arm and at the other end to said frame plate. The free end of the arm 94 is formed into a hook or notch, so that when the lever 79 is operated by the key 70, said hook engages the bracket 95 and retains said lever in its operated position. The arm 94 has an arm 97 projecting therefrom and forming a notch between the arm 94 and the free end of the arm 97. In this notch lies a lever 98 which is loosely pivoted on a rod 99 secured at its ends in the frame plates 5 and 7. The lever 98 is held against motion endwise of the rod 99 by two collars 100 mounted on said rod on opposite sides of the lever 98 and secured in position on said rod by set screws. The faces of the collars 100 next to the lever are so formed as to permit said lever to swing in any direction about the rod as a pivot but so as to prevent the lever from rotation about its own length as an axis. The lever 98 is drawn toward the bottom of the notch and toward the arm 94 by an obliquely disposed spring 101 connected at one end to the lever and at the other end to the frame plate 7. The free end of the lever 98 stands near a worm 102 mounted on the shaft 9, but said lever is normally held out of engagement with said worm by the arm 94. When said arm is moved longitudinally by the depression of the lever 79, however, the free end of the lever 98 is permitted to fall under the impulse of its spring 101 on to the worm 102, which as the shaft 9 is rotated moves the free end of said lever toward the right. As the shaft 9 rotates, the worm 102 moves the lever 98 toward the right until said lever engages the arm 97 and withdraws the hook end of the arm 94 away from the bottom of the slot in the bracket 95, thus releasing said hook and permitting the lever 79 to return to normal position. The parts are so proportioned that it requires at least half a turn of the shaft 9 to thus release the lever 79 and with it the bar 73.

From the description above given of the operation of setting the registering wheels to zero, it will be seen that after the hook 94 has been released it is necessary for the shaft 9 to make at least a little over three-quarters of a rotation before the register wheels come to rest in their zero positions. In order to insure that none of the setting levers 16 shall be actuated either during the time in which the bar 73 is held in its right-hand position or during the next rotation of the shaft 9 thereafter, an electric switch is provided including a two-armed spring 103 (Fig. 3) that normally connects two contact pieces in a conductor which is common to all of the circuits that control the digit selecting and denomination selecting magnets; and means are provided whereby said springs 103 normally connect said contact pieces but whereby said springs are held out of engagement therewith to break the circut until the zero setting operation is completed, thus making it impossible to operate the setting up mechanism during this period.

The spring 103 is mounted on a block 104 of insulating material which in turn is mounted on one end of a lever 105, which is pivoted on a shouldered and headed screw 106 that is threaded into the upper side of a bracket 107 that projects inward from the frame plate 5. On the opposite end of the lever 105 from the spring 103 there is mounted a dog 108, the end of which projects beyond the end of the lever 105 and is formed with one abrupt and one inclined face. The pointed end thus formed is adapted to engage the threads of a worm 109 on the end of the shaft 9. The dog 108 is slidably mounted on the lever 105 by means of two screws 110 which extend through elongated slots in said dog and are threaded into said lever. A spring 111 is connected at one end to one of the screws 110 and at the other end to the upturned end of the dog 108 and said spring presses said dog toward the end of the lever with its pointed end in engagement with the worm 109. The lever 105 stands in the path of the free end of the lever arm 83 so that when said lever arm is moved toward the right by the depression of the zero key the lever 105 has its forward end moved toward the right, the inclined face of the dog 108 snapping over the threads of the worm 109. The lever 105 will obviously be held in this position until the hook 94 is released, after which said lever is pressed by a spring against the threads of the worm 109 and said threads are so designed that it will require nearly a complete rotation of the shaft 9 to permit the lever 105 to resume its normal position.

A series of arc-shaped plates 112 are mounted adjacent the several register wheels 8 in such position that one of said plates stands a little to the right of each of said register wheels covering that part of each of said wheels that contain the nine pins 14 below and in front of that pin 14 which is in engagement with the stop 15. One of the functions of these plates 112 is to prevent overthrow of the pins 14 when they are struck by the setting levers 16. Said plates are also so mounted that the entire series thereof may be moved toward the left into engagement with their respective wheels 8, thus restoring to inoperative position any pin 14 that may have been set to operative position. The plates 112 are seated in vertical slots in three reciprocatory bars 113 that are slidably mounted at their ends in the frame plates 6 and 7 or in brackets mounted on said plates. In order to cause all of the bars 113 to move together when they are operated, one or more of the plates 112 have rigidly secured thereto a block 114 having two holes therein through which pass two slide rods 115 which are slidably mounted at their ends in the frame plates 6 and 7. The block or blocks 114 are secured to the rods 115 by set screws 116 threaded through said blocks and engaging said rods. It will be seen that the plates 112, bars 113 and rods 115, thus form a frame that is adapted to be reciprocated lengthwise so as to move the plates 112 toward and from their respective register wheels. In order to provide a remedy in case any pin 14 should by any means have become wrongly set, means are provided whereby the zero setting mechanism operates this pin resetting frame. To this end the middle one of the bars 113 is prolonged through the frame plate 7 into the right-hand compartment of the adding machine. A lever 117 is pivoted on a shouldered and headed screw 118 that is threaded into a bracket 119 projecting from the frame plate 7 and one end of this lever stands opposite the projecting end of said bar 113. The other arm of the lever 117 is in position to be engaged by a lug 120, projecting downward from the sliding bar 71. The construction is such that when the zero key 70 is operated the lug 120 will operate the lever 117 and operate the pin resetting frame. Said frame is returned to normal position by a flat spring 121 that is secured to the frame plate 7 and at its free end presses against a pin 122 projecting from the middle sliding bar 113.

The adding machine is adapted to be electrically connected with any ordinary typewriting machine, and it is here shown connected with a Remington No. 6 typewriter. When this machine is used for writing numbers in columns it is ordinarily equipped with a denominational tabulator and said machine is shown so equipped in the present instance. Said tabulator comprises a tabulator stop bar 123 that is mounted on a bracket 124 that projects toward the rear of the machine from the carriage 125. The tabulator stop bar 123 is formed on its front and rear faces with vertical slots a letterspace distance apart and into any one of said slots a column stop 126 is adapted to be set. Said column stop is controlled in a well known manner by a series of denomination stops 127 consisting of the forwardly projecting upper ends of a series of levers 128 (Fig. 7) which are controlled by denomination keys at the front of the machine. The tabulator is so constructed that when one of said keys corresponding to a certain denomination is operated, one of the stops 127 is moved toward the front of the machine into the path of the stop 126 and at the same time the carriage is released from its step-by-step feed mechanism and is drawn toward the left by its driving spring until arrested by the stop. The denomination stops 127 are mounted in a frame 128ª which is connected with a frame piece 129 which has the form of a yoke frame, the forwardly extending arms of which are mounted on a rod 130 which constitute one of the rails which guide the carriage 125. The contact shoe 38 is mounted on a bracket 131, the front face of which is slotted, as shown in Fig. 11, at 132 to embrace the tabulator bar 123. The bracket 131 is mounted on said tabulator bar with its end in engagement with the column stop 126 and it is secured in position by tightening a set screw 133. The contact block 38 is secured to the bracket by insulating material 135. The wires 37 which form parts of the circuits of the denomination selecting magnets terminate in the rearwardly projecting ends of contact pieces 136 that are mounted in a block 137 of insulating material mounted on the frame piece 129. The forward ends of the contact pieces 136 lie flush with the front face of said block 137. Said contact pieces 136 are arranged in two horizontal rows in staggered arrangement and between said rows lies a common conductor bar 138. The circuit is completed by connecting said common conductor bar 138 with one after another of the contact pieces 136 through the shoe 38 which has three spring pressed contact pins 139, one for the upper and one for the lower row of contact pieces 136 and one for the contact bar 138.

It is pointed out in the patent above referred to that the adding mechanism thus far described is capable of two modes of operation. According to one of said modes of operation the shaft 9 may be normally at rest and a number may be written on the typewriting machine and the stop pins 14 appropriate to the digits of said number, may be set up in the appropriate wheels 8, after which the shaft 9 may be caused to turn a suitable distance, for example, through a complete rotation, and the number set up would thus be added. A new number may then be written on the typewriting machine and set up on the adding mechanism, and the shaft 9 be given another rotation. According to the second mode of operation the shaft 9 may be continuously driven by any suitable motor. In this case when any numeral key is struck when the carriage is in position to write numbers in the adding column, the appropriate stop pin in the appropriate register wheel will be set and said wheel released for rotation and it will immediately begin to turn with the shaft 9 until arrested by the newly set pin. It is this latter mode of operation that is more fully set forth in said patent, but it is the first of said modes of operation that is contemplated in the present instance. As set forth in said patent, the shaft 9 had mounted thereon a bevel gear 140 that meshed with a beveled gear 141 mounted on a vertical shaft 142 which extended through and below the horizontal frame plate 4 into the lower part of the machine where said shaft was suitably geared to an electric motor that was permitted to run during the entire time that the adding machine was in use. It will be obvious that the machine set forth in said patent can be operated according to the first mode of operation above set forth by starting and stopping the electric motor. In the present instance I use the gears 140 and 141 and the shaft 142 but said shaft does not extend through the frame plate 4 and it is connected with the motor by a clutch device so that said shaft may be started and stopped without starting and stopping the motor. The shaft 142 is journaled in bearings in a bracket 143 that rises from the frame plate 4 to which it is secured by screws 144. Endwise motion of said shaft is prevented by two collars 145 mounted on said shaft respectively beneath the upper and above the lower of the two bearings and secured in position on said shaft by set screws 146. A vertical shaft 147 is co-axial with the shaft 142 and has its upper end just below the lower end of the latter shaft. The shaft 147 is journaled beneath the frame plate 4 in a bracket 148 that is secured to the underside of the frame plate 4 by screws 149. Said shaft has mounted on its lower end a worm wheel 150 that is engaged by a worm on the shaft of the electric motor; or said shaft 147 may be geared to said motor in any suitable manner. It will, of course, be understood that any suitable means may be provided for continuously rotating the shaft 147. Endwise motion of said shaft is prevented in one direction by the engagement of the worm wheel 150 with one of the bearings of said shaft and in the other direction by a collar 151 secured to said shaft by a set screw 152. The shafts 147 and 142 are adapted to be coupled together by a clutch device, the lower member of which consists of a crown toothed ratchet wheel 153 mounted on the upper end of the shaft 147 and secured thereon by a set screw 154. The upper member of said clutch device comprises a hub or bearing member 155 that is mounted on the lower end of the shaft 142 and fixed thereon by a set screw 156. The bearing piece 155 has arms 157 in which are journaled the ends of a horizontal rock shaft 158. On one of the projecting ends of said rock shaft there is rigidly mounted an arm 159 in the free end of which is formed a notch 160 (Fig. 2) into which a pin 161 projects from a pawl or dog 162 that is pivoted by the side of the arm 159 on a shouldered and headed screw 163 which is threaded into the end of the shaft 158. The notch 160 is wider than the pin 161 and said pin is normally held against the upper wall of said notch by a light flat spring 164 that is fastened to the upper edge of the pawl 162 and engages the upper edge of the arm 159. A spring 165 is coiled about the shaft 158 between the two arms 157 and is connected at one end to said shaft and at the other end to one of said arms. Said spring tends to rotate the shaft 158 in a direction to move the pawl 162 into engagement with the teeth of the ratchet wheel 153 and thus to couple the shaft 142 with the shaft 147.

In order to normally hold the pawl 162 up out of engagement with the ratchet wheel 153 an upright arm 166 is mounted on the end of the shaft 158 opposite said pawl 162 and is rigidly secured to said shaft by a screw 167 threaded into the end of the shaft. The upper end of the arm 166 is normally engaged by a lug 168 depending from the free end of an arm 169 that is pivotally mounted on the frame plate 5 by means which will presently be described. For some of the purposes of my invention any suitable means may be provided for moving the lug 168 out of the path of the arm 166. If said lug be momentarily moved out of engagement with said arm the spring 165 will immediately turn the shaft 158 and move the pawl 162 into engagement with the ratchet wheel 153. The arm 166 being thus moved a little toward the right-hand side of the machine, the lug 168 can no longer get in front of said arm. In order to permit the arm 169 to be restored to normal position as promptly as possible, the rear face of the upper end of the arm 166 is beveled, as shown in Fig. 1, at 170. When the pawl 162 engages the ratchet wheel 153 and the two shafts are thus coupled together they are free to make at least one entire rotation together. If, meanwhile, the arm 169 has been restored to normal position the lug 168 will be in the path of the arm 166 and when said arm engages said lug it will be arrested thereby and the shaft 158 will be forced to rotate toward the left-hand side of the machine, thus raising the arm 159 on said shaft. The pawl 162 will be held by friction in engagement with one of the teeth of the ratchet wheel 152 until the lower wall of the notch 160 strikes the pin 161 and forces said pawl away from said tooth. As soon as the pawl is free from the tooth the spring 164 will raise said pawl until the pin 161 engages the upper wall of the notch 160. By this means the pawl 162 will always be elevated a sufficient distance above the tops of the teeth of the ratchet wheel to insure that said teeth will not again strike said pawl until the arm 166 has been again released.

It will be perceived that when the arm 166 is in engagement with the lug 168, the spring 165 tends to rotate the shaft 142 backward. In order to hold said shaft against such backward turning, I have provided a detent device, shown in Figs. 2 and 6. The bearings of the shaft 142 in the bracket 143 are two-piece bearings, each comprising a member 171 which is secured to the bracket 143 by screws 172. One of said bearing members is formed on its inner face with a segmental slot 173 that is eccentric to the opening in which the shaft 142 is journaled and in said eccentric slot is mounted a detent roller or ball 174 that is pressed against the shaft 142 by a compression spring 175. The construction is such that the roller 174 permits the shaft 142 to turn free in one direction but not in the other.

I prefer to operate the arm 169 to release the clutch mechanism above described by means of a two-pole electromagnet 176 which is mounted on the inner face of the frame plate 5 by screws passing from said frame plate and threaded into holes 177 (Fig. 3) formed in the iron member 178 that connects the two coils of the electromagnet. Said coils are mounted one above the other, as shown, and they coöperate with an armature 179 that is pivoted on pins 180 that project into said armature from two brackets 181, that are secured to the inner face of the frame plate 5 by screws 182. The arm 169 projects toward the left from the armature 179. Said armature is normally drawn away from the electromagnet 176 by a spring 183 (Fig. 1) which is connected at one end to said armature and at the other end to a pin 184 projecting from the frame plate 5.

The electric circuit of the electromagnet 172 may be controlled by any suitable circuit controller, such, for instance, as a special key; but I prefer to control said circuit automatically by the return motion of the carriage. To this end I have mounted on the top of the insulator block 137 a conductor plate 185 which is connected by a binding screw 186 and wire 187 with the electromagnet 176. A lever 188 is pivoted on the conductor plate 185 by means of a shouldered and headed screw 189. The lever 188 is normally pressed toward the back of the machine by a spring 190 secured to said lever and engaging a pin 190ª projecting from the block 137, and the backward motion of said lever is limited by another pin 191 also projecting from said insulating block. At its free end the lever 188 is provided with a contact piece 192 adapted to engage a coöperating contact piece on a conductor 193 which is secured to the top of the insulator block 137 by screws 194. One of said screws is connected by a wire 195 with a certain common conductor 196 that forms part of the electrical connections of the adding machine. Said conductor 196 is connected to a source of electricity 197 by conductors including a main switch 198. The other side of said source of electricity is connected with another conductor bar 199 which in turn is connected with the electromagnet 176. The lever 188 is formed with a rounded forwardly projecting arm 200 that stands in the path of a friction device comprising a shoe of insulating material 201 mounted on a spring 202 that is bowed toward the back of the machine from the bracket 131 on which the contact block 138 is mounted. The spring 202 is secured to said bracket at one end by a screw 203 and at the other end said spring is slotted to embrace a headed pin 204. The construction is such that as the shoe 201 passes the arm 200 it is pressed by the spring 202 against said arm. When the carriage is moving toward the left the friction of said shoe 201 against the arm 200 tends to press the lever 188 toward the rear of the machine; but when the carriage is drawn toward the right to begin a new line, these friction devices move the lever 188 toward the front of the machine and bring the contacts 192 into engagement, thus momentarily closing the circuit through the magnet 176 with the result that the stop lug 168 on the arm 169 is withdrawn from the path of the arm 166 and the shaft 142 and with it the shaft 9 are permitted to make a single rotation, after which they are again arrested by the lug 168. It will be observed that should the movement of the typewriter carriage from left to right be stopped while the friction devices 200 and 201 are in contact, the lost motion in the typewriter carriage parts will be taken up by the carriage tension spring and the carriage will be moved slightly from right to left and the contacts 196 will be thus thrown out of engagement.

It will be perceived that after the several pins 14 have been set in the register wheels, said register wheels remain at rest until the typewriter carriage is withdrawn toward the right. If prior to this time the operator observes that he has struck the wrong numeral keys and thus written the wrong number on the typewriting machine and set up the wrong number on the adding machine, he has an opportunity to correct the number thus erroneously set up. This correction would be made on the typewriting machine by simply erasing the number, and the correction would be made on the adding machine by means which will now be described. Said means are operated by a correcting key 205 that projects from the right-hand end of the adding machine. Said key is mounted on a stem 206 that is slidably mounted in an elongated bearing 207 having an enlarged threaded portion 208 that is screwed through a suitable threaded hole in the frame plate 5, and that also extends through a suitable hole in the casing 209 (Fig. 1). The outward motion of the key stem 206 is limited by a collar 210 secured on said stem by a set screw and engaging the inner end of the bearing 207. The inner end of the key stem 206 engages one end of a lever 211, the hub 212 of which is rigidly mounted by means of a set screw on a vertical rock shaft 213 which is journaled at its ends in brackets 214 projecting from the frame plate 7.

It will be understood from the description of the adding mechanism given above that in each of those register wheels 8 in which a digit has been set up, that stop pin 14 which was in engagement with the stop 15 has been reset to inoperative position. It is necessary that the correcting key set all of these pins back to operative position. This is done by operating the bell crank levers 63, moving the T-shaped end 67 of each of said bell cranks toward its register wheel, thus pushing the pin 14 back to operative position. In order to operate all of these levers by the correcting key, a bar 215, shown in perspective in Fig. 9, is slidably mounted in the frame plates 6 and 7, just above the frame bar 32. Said slide bar is formed with a series of forwardly projecting arms 216, the forward ends of which are bent downward, as shown at 217, Figs. 4 and 9. Each of the downwardly extending arms 217 lies just to the left of one of the lever arms 67, in such position that if the slide bar 215 be moved toward the right all of said levers will be operated and all of the stop pins standing opposite said levers will be set to operative position. In order to so move said slide bar its right-hand end is bent up to form a lug 218 that lies in the path of the lever 211. The slide bar 215 is returned to normal position by a spring 219 that is secured to the frame plate 7 by a screw 220 and the free end of which engages a pin 221 depending from the slide bar 215. The motion of said slide bar under the impulse of said spring is limited by a pin 222 projecting upward from said slide bar in position to engage the frame plate 7. The lever 211 is restored to normal position by a spring 223 that is connected at one end to said lever and at the other end to the frame plate 5.

In order to reset to inoperative position all of the pins 14 which have been set to operative position by the setting levers 16, the pin resetting frame hereinbefore described is operated. To this end the lever 117 which operates said frame is extended beneath the slide bar 215 and into the path of a pin 224 projecting downward from said slide bar. The construction is such that when the correcting key 205 is pushed inward all those pins 14 which are in position to engage the stops 15 will be set to operative position and all those pins 14 which have been set to operative position in accordance with the digits of a number will be reset to inoperative position by the arc-shaped plates 112.

Means are provided whereby when the zero key 70 is depressed the clutch mechanism between the shafts 142 and 147 will be brought into operation. As has been explained above this clutch mechanism is adapted to be thrown out of operation automatically at the end of a single rotation of the shaft 142, but it requires more than a single rotation of said shaft to complete the zero setting operation. I have, therefore, provided means whereby when the zero key is depressed the arm 169 is held in its inoperative position until after the first rotation of the shaft 142 is completed and is restored to operative position before the completion of the second rotation of said shaft so that when said shaft completes its second rotation it will be arrested by said arm. To this end a vertical rock shaft 225 is journaled in two brackets 226 that project from the frame plate 5 to which they are secured by screws 227. At its upper end the rock shaft 225 carries an arm 228 having a pin 229 projecting therefrom into the path of the lever 105. At its lower end the rock shaft 225 has projecting therefrom an arm 230 having a pin 231 projecting from its free end into the path of an arm 232 which is secured to the upper end of the armature 179 by screws 233. As shown in the present instance it is to a branch of this arm 232 that the returning spring 183 is connected. The construction is such that when the arm 105 is moved toward the right by the depression of the zero setting key 70, said arm, engaging the pin 229, rocks the rock shaft 225 and the pin 231, engaging the arm 232, moves the armature 179 and with it the arm 169 to inoperative position. It will be recalled that the lever 105 is held in its operative position through at least a half turn of the shaft 9 by the hook 94, and that said lever is not entirely returned to normal position until the shaft 9 has made nearly or quite another rotation on account of the engagement of the dog 108 with the worm 109.

This lever is, therefore, held away from its normal position for more than one complete rotation of the shaft 9 and less than two complete rotations thereof. The arm 169 will, therefore, be in inoperative position when the shaft 142 completes its first rotation and will be restored to operative position before said shaft completes its second rotation, so that said shaft will be arrested at the end of its second rotation.

The electrical connections between the carriage and keys of the typewriter and the denomination and digit selecting magnets, are shown more especially in Figs. 13–16. As has already been explained, it is only essential that when a numeral key is depressed at a time when the carriage is in the adding column, an electric circuit shall be completed through the proper one of the digit selecting magnets 36 and the proper one of the denomination selecting magnets 46. This circuit may be completed in this way by any suitable means. As shown in the present instance, each of the numeral keys 230 is mounted on the usual key lever 231 which is pivoted at its rear end on a wing or web 232 depending from the back shelf 233 of the typewriting machine, the keys being held in normal position by springs 234. The key-controlled electric contacts shown in the present instance are mounted within the box 50 of insulating material and said box is provided with a removable lid 235 which covers the whole of said box except in one corner in which is mounted a stationary piece of insulating material 236, one corner of which is supported by a post 237. The wires 49 that lead to the digit selecting electro magnets 46, terminate in a series of metallic pieces 238 which are mounted in a piece of insulating material 239 and which are separated from each other by strips of insulating material 240, the whole constituting a plug that is adapted to be seated in an opening 241 (Fig. 12) in the corner piece 236. The plug is retained in position by a headed pin 242 that passes through the piece 236 and through an opening 243 (Fig. 15) in the plug. The construction is such that the plug may be readily removed in case it is desired to disconnect the typewriting machine from the cable 3. A series of spring conductors 244 are secured to the base of the box 50 by screws 245 and said springs bear against the conductor pieces 238 when the plug is in position. The springs 244 are connected by wires 246 with resilient flat conductors 247 which are secured at their rear ends to the base of the box 50 by screws 248. Each of the springs 247 has an opening therein through which there passes loosely a post 250 on which is threaded a thumb nut 251 by adjusting which the normal position of the spring may be regulated. The free end of each of the springs 247 carries a contact point 252 which is adapted to be engaged by a second contact point 253 mounted on the rear end of an arm 254 which is pivoted on a rod 255 that is mounted at its ends in posts 256 rising from the base of the box 50. The arms 254 are normally held by springs 257 in their upper positions in which the contact points 253 and 252 are out of contact and in which the arms 254 are arrested by adjustable stop screws 258 which are threaded through a bar 260 suitably supported in the box 50. Each of the arms 254 is adapted to be engaged by a spring-pressed hook 261 that extends upward through a suitable opening in the bottom of the box 50 and which, at its lower end, is pivotally connected with one of the numeral key levers 231. The construction is such that when any of said numeral key levers is depressed the corresponding arm 254 will be depressed and will bring the contact points 252 and 253 into contact. All of the arms 254 are mounted on the bar 255 and are in electrical contact with said bar. Said bar is connected by a wire 262 with one of the springs 244 through which said wire is connected with a wire 263 (Fig. 16) that runs up through the cable 3 and is connected at its upper end with the universal contact piece 138. The construction is such that, the carriage being in the adding column, when a numeral key is depressed a circuit is completed through the rod 255, arm 254, wire 49 to the digit selecting magnet 46 corresponding to the key depressed, thence to the common conductor 196, to the battery or other source of electrical energy, thence to the common conductor 199 through that one of the denomination selecting magnets 36 which corresponds to the denominational position of the carriage and through a wire 37 and contacts 139 in the shoe 38 to the conductor bar or strip 138, and thence through the wire 263 back to the bar 255.

It will be obvious that various changes may be made in the details of construction and arrangement without departing from my invention.

It will also be obvious that some of the features of my invention are capable of use in connection with adding mechanism differing widely from that here shown.

What I claim as new and desire to secure by Letters Patent, is:—

1. In an adding device, the combination of a typewriter having means including numeral keys for writing any words and numbers; a series of registering elements; means controlled by said numeral keys for setting up digits in one denomination after another; a power device; and means controlled automatically by a moving part of said typewriter for bringing said power device into operation after a number has been set up, to actuate said registering elements.

2. In an adding device the combination of registering elements for adding numbers of a plurality of denominations; a group of numeral keys; a step-by-step device for bringing one denomination of said registering elements after another under the control of said keys; a power device; and means controlled by a movement of said step-by-step device for bringing said power device into operation to actuate said registering elements.

3. In an adding device, the combination of a series of registering elements; setting-up devices for controlling said registering elements; a group of numeral keys; a carriage adapted to connect said keys with one denomination after another of said setting up devices; a power device; and means controlled by said carriage for bringing said power device into operation after a number has been set up to actuate said registering elements.

4. In an adding device, the combination of a series of registering elements; a group of numeral keys; a carriage; means controlled by said keys and carriage for setting up the digits of a number one after another; and means brought into operation by the return motion of said carriage for actuating said registering elements to add the number set up.

5. In an adding device, the combination of a series of registering elements; a group of numeral keys; a carriage; means controlled by said keys and carriage for setting up the digits of a number one after another; and means operated by a power independent of that applied to the carriage and brought into operation by the return motion of said carriage for actuating said registering elements to add the number set up.

6. In an adding device, the combination of a continuously rotative shaft; a series of registering elements; a group of keys common to all of said registering elements; means controlled by said keys for setting up digits on one after another of said registering elements; and means brought into operation after a number has been set up for connecting said registering elements with said shaft.

7. In an adding device, the combination of a series of register wheels; a series of keys; key controlled electrical devices for setting up a number to be added on said register wheels; power driven means for operating said register wheels; and electrically operated means for bringing said power driven means into operation.

8. In an adding device, the combination of a series of register wheels; means for setting up a number to be added on said register wheels; a continuously rotative shaft; means for operating said register wheels; and a clutch device adapted to couple said operating means with said continuously rotative shaft after a number has been set up.

9. In an adding machine, the combination of a series of register wheels; a shaft for operating said register wheels; a continuously rotative member; and a clutch device for connecting said shaft and member, said clutch device comprising a rocking member mounted on said shaft and having an arm; a movable stop normally in the path of said arm; a pawl mounted on said shaft and having lost motion connection with said rocking member and adapted to engage said continuously rotative member; and means for moving said stop out of the path of said arm.

10. In an adding machine, the combination of a series of register wheels; a shaft for operating said register wheels; means for imparting a single rotation to said shaft to add a number; and zero setting mechanism including means for affording to said shaft a plurality of rotations.

11. In an adding machine, the combination of a series of registering elements; a series of settable stops for controlling the motion of said registering elements; means for setting one of said stops to operative position and resetting to inoperative position that stop that was previously in operative position, and a correcting device for resetting the first mentioned stop to inoperative position and again setting the last mentioned stop to operative position.

12. In an adding machine, the combination of a series of registering elements; a series of settable digit determining members for each of said registering elements; means for setting up a digit to be added on any registering element, said means including means for setting one of said stops to operative position and resetting to inoperative position that stop which was formerly in operative position; a correcting key and connections adapted to reset to inoperative position all those stops pertaining to the several registering elements that have been set to operative position to set up a number to be added, and means for restoring to operative position all those stops pertaining to the several registering elements that have been reset to inoperative position in setting up said number.

13. In an adding machine, the combination of a series of register wheels, each carrying a series of settable stops, one stop being normally in operative position; means for setting to operative position the stops in the several wheels appropriate to the digits of a number to be added, and for resetting in said wheels those stops that were in operative position; a correcting device including means for resetting to inoperative position those stops that were set in setting up a number; and means for restoring to operative position those stops that were reset to inoperative position in setting up said number.

14. In an adding machine, the combination of a series of register wheels, each carrying a series of settable stops, one stop being normally in operative position; means for setting to operative position stops in the several wheels appropriate to the digits of a number to be added, and for resetting in said wheels those stops that were in operative position; a correcting device including means for resetting to inoperative position those stops that were set in setting up a number and means for restoring to operative position those stops that were reset to inoperative position in setting up said number; and means for operating said register wheels after a number has been set up.

15. In an adding machine, the combination of a driving shaft; a series of register wheels, each independently frictionally connected with said driving shaft; a continuously rotative member; means for setting up a number to be added on said register wheels; and means for coupling said driving shaft with and automatically uncoupling it from said continuously rotative member.

16. In a combined typewriting and adding device, the combination of a series of keys including numeral keys; printing instrumentalities controlled by said keys; a series of registering elements for adding numbers written on said typewriting mechanism; means controlled by said numeral keys for controlling the motion of said registering elements; a power device for driving said registering elements; and means controlled by a movement of the carriage of the typewriting machine for bringing said power device into operation.

17. In a combined typewriting and adding device, the combination of a series of keys including numeral keys, printing instrumentalities controlled by said keys; a series of registering elements for adding numbers written on said typewriting mechanism; means controlled by said numeral keys for controlling the motion of said registering elements; a power device for driving said registering elements; and electrically operated means controlled by a movement of the carriage of the typewriting machine for bringing said power device into operation.

18. In an adding machine, the combination of a series of register wheels; a driving shaft for said register wheels; a power device for operating said driving shaft in one direction; means for connecting said driving shaft with and disconnecting it from said power device; and a detent for preventing backward rotation of said driving shaft.

19. In an adding machine, the combination of a series of registering elements; means for controlling the motion of said registering elements to add numbers; a power device; means for connecting said power device with said registering elements to operate the latter to add numbers; and a zero setting mechanism including a key and means controlled by said key for connecting said power device with said registering elements and for arresting said registering elements in their zero positions.

20. In a typewriting and adding device, the combination of a series of keys including numeral keys; printing instrumentalities controlled by said keys; a series of registering elements; electrical devices controlled by said numeral keys for setting up a number to be added on said registering elements; a power device for operating said registering elements after a number has been set up; electrically operated means controlled by the typewriting mechanism for bringing said power device into operation; and a zero setting mechanism for the adding mechanism, said zero setting mechanism including a zero key and means controlled by said key for bringing said power device into operation and for controlling the operation of said power device to set said registering elements to zero.

21. The combination of an adding wheel, means for rotating said wheel, settable stops carried by said wheel, means for moving said stops to operative position, and independent means for replacing said stops to their original positions before the wheel is rotated.

22. The combination of a series of adding wheels, settable stops carried by said wheels, means for moving said stops to operative position, and a correction key and connections for replacing said stops to their original positions.

23. The combination of a series of adding members, means for operating said adding members, movable stops carried by said adding members for limiting the movement thereof, and means for replacing said stops to their original positions after being moved and before said adding members are operated.

24. The combination of a series of independently frictionally driven adding wheels, means for rotating them, settable means for limiting said rotation, means for operating said settable means, and means for replacing said settable means to their original positions before said wheels are rotated.

25. The combination of a typewriter, a series of adding wheels controlled by the keys and carriage of said typewriter, means for limiting the movement of said adding wheels controlled by said keys and carriage, means for rotating said wheels, and means for replacing said limiting means to their original positions before the operation of said rotating means.

26. The combination of a series of adding wheels, independent frictional means for rotating each adding wheel, a series of settable stops for holding each of said adding wheels against rotation, means for moving said stops out of holding position, and means for replacing said stops into their holding position before the operation of said rotating means.

27. The combination of an adding wheel, frictional means for rotating said wheel, a movable stop for holding said wheel against rotation by said frictional means, means for moving said stop out of said holding position, and means for replacing said stop back again into said holding position before the operation of said rotating means.

28. In a typewriting and adding machine, the combination of typewriting mechanism and adding mechanism including means for writing the digits of a number by said typewriting mechanism and setting up said number in said adding mechanism, a power device for operating said adding mechanism, and means controlled by a part of the typewriting mechanism for bringing said power device into operation after the number has been written and set up.

29. In a combined typewriting and adding machine, the combination of keys including numeral keys, means controlled by said keys for writing the digits of a number and for setting up said number in the adding mechanism, a power device for operating said adding mechanism in accordance with the number set up, electrical means for bringing said power device into operation, a switch for controlling said electrical means, and means for automatically operating said switch once for each number written.

30. In a combined typewriting and adding machine the combination of typewriting mechanism and adding mechanism including means for setting up numbers to be added, means for operating said adding mechanism, electric circuits for controlling said setting up means, said electric circuits including contacts controlled by the typewriting mechanism, an electric circuit for controlling said operating means, said electric circuit including a contact controlled by said typewriting mechanism.

31. The combination with typewriting mechanism of adding mechanism including means for setting up the digits of a number to be added, means for operating the adding mechanism once in accordance with the whole number set up, a power device for actuating said operating mechanism, and means controlled automatically by the typewriting mechanism for bringing said power device into operation to actuate said operating mechanism.

32. In a combined typewriting and adding machine, the combination with typewriting mechanism of adding mechanism, an electric circuit controlling said adding mechanism, and a circuit controller for said circuit, said circuit controller being automatically operated once for each line of writing.

33. In a typewriting and adding machine, the combination with the keys and carriage of a typewriting machine, of adding mechanism controlled by said keys and carriage, a power device for operating said adding mechanism, and means controlled by said carriage for bringing said power device into operation, said means including a lever and a friction device whereby said lever is operated, the construction being such that the lever is operated when the carriage moves in one direction but not when the carriage moves in the other direction.

34. In an adding machine, the combination of a series of registering elements, settable devices for the several registering elements and a correcting device including a correction key and a bar 215 extending across said series of registering elements and adapted to reset the settable device for each of said registering elements, said bar being operated by said correction key.

35. In an adding machine, the combination of a series of register wheels, settable stops carried by said register wheels, means for setting to operative position in any register wheel the settable stop corresponding to the digit to be added and for resetting to inoperative position the stop that was set in the previous operation of the machine, and a correction device including a bar extending across said series of wheels, and means operated by said bar for resetting to operative position any stops that may have been set to inoperative position.

36. In an adding machine, the combination of a series of denominational devices, means normally holding said denominational devices against operation, a series of keys means controlled by said keys for moving said holding devices to inoperative position, and means for restoring said holding devices to operative position in order to make corrections.

37. The combination with a typewriting machine having numeral keys, of an adding mechanism, electrical means operable by the numeral keys of the typewriter for controlling the adding mechanism, means for actuating the adding mechanism, means on the typewriter carriage independent of said keys for controlling said electrical means and other means on the typewriter carriage for controlling the means for actuating the adding mechanism.

38. The combination with a typewriting machine, of an adding mechanism, electrical means operable by the numeral keys of the typewriter for controlling the adding mechanism, means for actuating the adding mechanism, adjustable means on the typewriter carriage for controlling said electrical means and other means on the typewriter carriage for controlling the means for actuating the adding mechanism.

39. The combination with a typewriting machine, of an adding mechanism, a plurality of electric circuits each including two contacts adapted to be electrically connected when a numeral key of the typewriter is operated and means for controlling the action of the adding mechanism, of electrically operated means for actuating the adding mechanism, a pair of contacts on the typewriter, each included in all of the circuits controlling the adding mechanism adapted to be electrically connected when the typewriter carriage reaches a predetermined point in its travel, and a second pair of contacts included in a circuit with the means for actuating the adding mechanism and adapted to be electrically connected as the typewriter carriage reaches a further point in its travel.

40. The combination with a typewriting machine, of an adding mechanism, a plurality of electric circuits each including two contacts adapted to be electrically connected when a numeral key of the typewriter is operated, and means for controlling the action of the adding mechanism, electrically operated means for actuating the adding mechanism, a contact moving with the typewriter carriage and included in all of the circuits controlling the adding mechanism, a relatively stationary contact included in said circuits and extending into the path of said contact on the carriage, and means for automatically closing an electric circuit including the means for actuating the adding mechanism after the typewriter carriage has moved far enough to disengage said contacts.

41. In an adding machine, the combination of a series of register wheels each carrying a series of settable stops, a bar extending across said series of wheels, and means operated by said bar for setting one stop in each wheel to operative position.

42. In a printing and adding machine, the combination of a series of registering elements; means for setting up numbers to be added on said registering elements; means for printing said numbers; means for controlling the spacing of the printing; a power device for actuating said registering elements; and means whereby said spacing means brings said power device into operation to actuate the registering elements.

43. The combination of a series of adding wheels, means for rotating said adding wheels, a series of settable stops for holding each of said adding wheels against rotation, means for moving said stops out of holding position, and means for replacing the same stops into their holding position before the operation of said rotating means.

44. The combination of a series of adding wheels, means for rotating said adding wheels, a series of sets of settable stops, one set for each wheel, said stops operating to hold said adding wheels against rotation, means for moving said stops out of holding position, and means for replacing the same stops into their holding position before the operation of said rotating means.

45. The combination of an adding wheel, means for rotating said adding wheel, a series of settable stops for holding said adding wheel against rotation, means for moving the holding stop out of holding position, and means for replacing said stop into holding position before the operation of said rotating means.

46. In a combined typewriting and adding machine, the combination of keys including numeral keys, means controlled by said keys for writing the digits of a number and for setting up said number in the adding mechanism, a power device for operating said adding mechanism in accordance with the number set up, and electrical means for bringing said power device into operation.

47. The combination of a typewriting machine for writing any words or numbers, an adding machine connected thereto for adding numbers written on the typewriter, a power device for operating said adding machine, and electrical means for bringing said power device into operation after the number has been written.

48. The combination of a typewriting machine for writing any words or numbers, adding mechanism for adding numbers written on the typewriter, a power device for operating said adding mechanism, means including an electromagnet for bringing said power device into operation after the number has been written, and a switch in circuit with said electromagnet.

49. In a typewriting and adding machine, the combination of a typewriter including a carriage, adding mechanism for adding numbers written on the typewriter, a power device for operating said adding mechanism, and means controlled by a movement of said carriage for bringing said power device into operation.

50. In a typewriting and adding machine, the combination of a typewriter including a carriage, adding mechanism for adding numbers written on the typewriter, a power device for operating said adding mechanism, and electrical means controlled by a movement of said carriage for bringing said power device into operation.

51. In a typewriting and adding machine, the combination with the keys and carriage of a typewriting machine, of an adding mechanism controlled by said keys and carriage, a power device for operating said adding mechanism, and means controlled by a movement of said carriage for bringing said power device into operation.

52. In a typewriting and adding machine, the combination of typewriting mechanism including a carriage, adding mechanism including setting-up devices for setting up numbers written on the typewriter, a power device for operating said adding mechanism in accordance with the numbers set up, means controlled by the typewriter carriage after a number has been written for calling said power device into operation, and means for correcting a number erroneously set up before the power device is called into operation.

53. In a typewriting and adding machine, the combination of typewriting mechanism including a carriage, adding mechanism including settable stops, means for setting said stops in accordance with numbers written on the typewriter, a power device for operating said adding machine, means controlled by the typewriter carriage for bringing said power device into operation after a number has been written, and means for changing the setting of said stops before said power device is brought into operation.

54. In a machine of the character described, a typewriter including a traveling carriage, a counter operating mechanism, a source of power, and means whereby the travel of the carriage automatically causes the operation of the counter-operating mechanism by the source of power.

55. In a combined typewriting and computing machine, the combination of a typewriter carriage, a series of printing keys and printing instrumentalities operated thereby and including keys and means for printing any words and numbers, computing mechanism including a series of register wheels for registering numbers written by said numeral keys, means actuated upon the depression of one of said keys to predetermine the extent of rotation to be imparted to one of said register wheels, power driven means for operating said register wheels, and means controlled by said carriage subsequent to the actuation of said predetermining means for bringing said power driven means into operation.

56. In a typewriting and computing machine, the combination of typewriting mechanism including a typewriter carriage and numeral printing keys, computing mechanism including a series of register wheels, means actuated upon the depression of one of said numeral keys to predetermine the extent of rotation to be imparted to one of said register wheels, a source of power, and means controlled by said carriage subsequent to such actuation of said predetermining means for automatically causing the operation of said register wheel by said source of power.

57. In a typewriting and computing machine, the combination of a traveling typewriter carriage, numeral keys and means actuated thereby for writing numbers, a series of register wheels, means actuated at a depression of one of said numeral keys to predetermine the extent of rotation to be given to one of said register wheels, a constantly rotating shaft, and means controlled by said carriage subsequent to the depression of said key for causing said shaft to turn said register wheels in accordance with said predetermining means.

58. In a typewriting and computing machine, the combination with a typewriter carriage, type-operating numeral keys, a letter feeding mechanism for said carriage operable by said keys, computing devices associated with said carriage, means set by said keys for determining the extent of operation of the computing devices, and an operator for moving the computing devices, of means connected to a motor or other source of power for actuating said operator, and means operable by the typewriter carriage at its return stroke, for enabling or causing said actuating means to operate.

59. In a typewriting and computing machine, the combination of a typewriter carriage, carriage feeding numeral keys, computing devices set by said keys, a general operator for said computing devices, an electric motor, and means dependent upon the return of said carriage for enabling said motor to actuate said operator.

Signed at the borough of Manhattan, city of New York, in the county of New York, and State of New York, this 1st day of August A. D. 1905.

ALBERT H. ELLIS.

Witnesses:
E. M. WELLS,
M. F. HANNWEBER.